United States Patent
Hausmann (10) Patent No.: US 9,879,787 B2
(45) Date of Patent: Jan. 30, 2018

(54) EXTRACTION VALVE

(71) Applicant: NISSAN MOTOR CO., LTD., Yokohama-shi, Kanagawa (JP)

(72) Inventor: Philipp Hausmann, Kirchheim (DE)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/039,209

(22) PCT Filed: Nov. 15, 2014

(86) PCT No.: PCT/EP2014/003061
§ 371 (c)(1),
(2) Date: May 25, 2016

(87) PCT Pub. No.: WO2015/078563
PCT Pub. Date: Jun. 4, 2015

(65) Prior Publication Data
US 2017/0159829 A1    Jun. 8, 2017

(30) Foreign Application Priority Data

Nov. 26, 2013 (DE) .......................... 10 2013 019 708
Nov. 28, 2013 (DE) .......................... 10 2013 019 877

(51) Int. Cl.
*F16K 31/12* (2006.01)
*F16K 1/30* (2006.01)
*F16K 31/06* (2006.01)

(52) U.S. Cl.
CPC ............... *F16K 1/30* (2013.01); *F16K 31/06* (2013.01)

(58) Field of Classification Search
CPC ............. F16K 1/30; F16K 31/06; F16K 31/03
(Continued)

(56) References Cited

U.S. PATENT DOCUMENTS 844,753 A * 2/1907 Samuelson ........... F16K 31/402
251/30.02
2,310,130 A * 2/1943 Thumim .................. F16K 31/42
251/284

(Continued)

FOREIGN PATENT DOCUMENTS

DE   10 2013 014 141 A1   2/2014
EP       0 263 346 A2      4/1988
(Continued)

*Primary Examiner* — Umashankar Venkatesan
(74) *Attorney, Agent, or Firm* — Foley & Lardner LLP (57) ABSTRACT

Extraction valve (4) for an highlypressurized gas flowing from a compressed gas reservoir (2), having a pressure sleeve (9) hermetically sealed on one side and a mobile extraction piston (17), which by moving releases or seals an extraction cross-section, and which on the open side of the pressure sleeve (9) protrudes at least partially into the same. An anchor (16) made of magnetisable material which is mobile in the pressure sleeve (9); an anchor which co-operates with an electromagnetic coil (12). A pilot bore (23) in the extraction piston (17), which connects the inside of the pressure sleeve (9) to a discharge opening (8) for the extracted gas and a sealing element (24), which is pressed by a spring element (26) in a seal-forming manner against the pilot bore (23) and is released in case of movement of the anchor (16). The extraction piston (17) is sealed off with respect to the pressure sleeve (9) by means of a gasket (36); and that a bypass bore (35) is arranged in the extraction piston (17), which bypass bore (35) extends between the side facing the region connected to the compressed gas reservoir (2) and the side of the extraction piston (17) facing the inside of the pressure sleeve (2).

13 Claims, 4 Drawing Sheets

(58) Field of Classification Search
USPC .......................................... 251/30.01, 30.02
See application file for complete search history.

(56) References Cited

U.S. PATENT DOCUMENTS

| | | | | |
|---|---|---|---|---|
| 3,666,231 A * | 5/1972 | Parodi | ...................... | F16K 31/06 |
| | | | | 251/129.1 |
| 4,799,645 A * | 1/1989 | Kramer | ................. | F16K 31/406 |
| | | | | 251/30.04 |
| 4,848,721 A * | 7/1989 | Chudakov | ............. | F16K 31/406 |
| | | | | 137/454.6 |
| 6,082,703 A * | 7/2000 | Fava | ........................ | F16K 3/08 |
| | | | | 251/129.11 |
| 7,722,009 B2 | 5/2010 | Perthel et al. | | |
| 2007/0272891 A1 | 11/2007 | Perthel et al. | | |
| 2014/0239207 A1* | 8/2014 | Ninomiya | ........... | F16K 31/0675 |
| | | | | 251/30.01 |

FOREIGN PATENT DOCUMENTS

EP           1 682 801 B1     3/2011
JP            60-21070 U      2/1985

* cited by examiner

EXTRACTION VALVE

The invention concerns an extraction valve for highly-pressurised gas flowing from a compressed gas reservoir according to the preamble of claim 1. The invention concerns moreover the use of such an extraction valve.

Extraction valves for highlypressurised gases flowing from a compressed gas reservoir, in particular for compressed natural gas or compressed hydrogen, which are stored typically at rated pressures of 260 bar or 700 bar, are known in the general state of the art. An extraction valve in the context of the invention can not only extract gas, but can also refuse gas into the compressed gas reservoir. Typically, the assembly is designed as a so-called pilot valve, in which the pressure of the gas is applied, via an adjusted ratio between a pilot bore and bypass bores or control bores, in a pressure sleeve presenting additional actuating elements of the extraction valve, in a supported manner for opening or closing the extraction valve or an extraction piston of the valve controlling an extraction cross-section.

An exemplary extraction valve is described in particular in EP 1 682 801 B1. The problematic with the assembly described above lies then especially in that the extraction piston must be kept in its open position by a differential pressure which is adjusted in such a way that gases to be extracted expand via gaskets, labyrinths and splits from one side of the extraction piston to the other side of the extraction piston. A corresponding pressure difference must be provided to guarantee the functionality. The purpose of this pressure difference enables to maintain the extraction piston in the open position. Practice has shown that the splits, labyrinths and gaskets do not provide sufficient pressure difference to guarantee the desirable functionality. This can be envisioned as a matter of principle, but requires quite a detailed layout of the gaskets on the basis of numerous experimental investigations, to provide the appropriate pressure difference.

Consequently, an extraordinarily high manufacturing tolerance must be kept in the area of the gaskets. The actuation still produces wear so that even after a short lifetime the desirable ratios cannot be maintained any longer and the problematic reappears in which the extraction piston closes involuntarily under certain situations. Said piston can be reopened however by electromagnetic forces. This causes however "flutter" of the extraction piston which on the other hand produces very discontinuous extraction current and on the other hand high noise emission. Moreover, the flutter causes enormous wear inside the electromagnetic extraction valve so that its lifetime is shortened.

The object of the present invention is to improve the described extraction valve.

According to the invention, said object is solved by the features mentioned in the characterising part of claim 1. Advantageous embodiments and developments are shown in the depending claims. Claim 13 presents moreover a particularly preferred usage of the extraction valve.

The extraction valve according to the invention sets forth that a mobile extraction piston is provided which by moving releases or seals an extraction cross-section. By design, it protrudes at least partially into the same on the open side of a pressure sleeve. Moreover, an electromagnetic coil is arranged around the pressure sleeve. A mobile anchor is positioned in the pressure sleeve, which anchor consists of a magnetisable material and which can be moved appropriately when the coil is applied with electric current. As in the state of the art, the extraction piston presents a pilot bore which connects the inside of the pressure sleeve to a discharge opening for the extracted gas. A sealing element is pressed against the pilot bore in a seal-forming fashion via a spring element and can release the pilot bore via an operative connection between the sealing element and the anchor when the latter moves. According to the invention, the extraction piston is made on its side facing the anchor at least partially of magnetisable or permanently magnetic material. Such a layout of the extraction piston at least on its side facing the anchor made of magnetisable material or of permanently magnetic material causes that in the open position of the anchor, when the latter is traversed by magnetic field lines, a portion of these field lines extends through the magnetisable material or co-operates with the permanently magnetic material. To do so, the extraction piston is pulled into the direction of the anchor when the coil is excited and when the anchor has reached its targeted open position through magnetic forces and maintained in this position. Involuntary closing of the pilot bore caused by the sealing element co-operating with the anchor can thus be avoided securely and reliably as long as the coil is excited. Consequently, a very simple and safe functionality can be achieved.

In the layout of the extraction valve according to the invention it is now moreover provided that a gasket is present between the extraction piston and the pressure sleeve which authorises a movement of the extraction piston in the type described and still guarantees a reliable hermetic seal between the pressure sleeve and the extraction piston. Since the propagation of pressure inside the pressure sleeve is important for the functionality, a bypass bore is, with the layout according to the invention, moreover arranged in the extraction piston, a bypass bore which connects together the area connected to the accumulator and the area of the extraction which faces the inside the pressure sleeve. Said bypass bore can establish an appropriate pressure compensation which sees to it that in closed position of the extraction piston, the pressure sleeve, at least after a certain period of time, is applied the pressure reigning in the compressed gas reservoir. According to the desired functionality, it is meaningful to throttle or to influence the gas flow accordingly through the bypass bore.

According to an advantageous further embodiment of the invention, it can thus be provided that a restrictor is arranged in the bypass bore. Such a restrictor can be realised by an appropriate bore diameter of the bypass bore. In a particularly favourable and advantageous further development of this idea the restrictor can also be in the form of a throttle sleeve mounted, in particular pressed-in, in the bypass bore. The bypass bore can be realised then comparatively simply with larger diameter, for example, a diameter of approximately one millimeter or a few millimeters. Subsequently, a sleeve corresponding to said diameter is pressed in, a sleeve which for its own part the diameter defined for the throttling, for instance a bore in the order of magnitude of 50-150 μm.

According to an advantageous further embodiment of the idea, it is also provided that the restrictor presents a smaller diameter than the pilot bore. This layout guarantees that the extraction valve always opens reliably. If the pilot bore opens, the pressure reigning in the inside the pressure sleeve is discharged in the direction of the discharge opening for the extracted gas. Since the diameter of the pilot bore is greater than the diameter of the restrictor, the gas flows out of the area of the accumulator through the restrictor more slowly than it is discharged through the pilot bore. The movement of the extraction piston into the open position is supported by said layout.

Ideally, there could be a large possible difference in the size ratio of the bores. This would be however detrimental when closing the extraction valve, i.e. when the extraction valve moves in the reversed direction. A compromise is selected in practice in which the restrictor exhibits a diameter in the order of magnitude of a third up to half the diameter of the pilot bore.

In an alternative embodiment of the idea, it can also be provided that a needle protruding in the direction of the extraction piston is arranged in the main body mounted rigidly beneath the extraction valve opposite the pressure sleeve, a needle which co-operates with the throttle position in such a way that a different diameter is released in the region of the restrictor according to the position of the extraction piston. Such a needle can co-operate ideally with the opening of the restrictor adapted to the needle in such a way that for instance in the lower position of the extraction piston, i.e. in the closed position, a very small cross-section is released between the needle and the restrictor. The result is the aforementioned effect which advantageously supports the opening of the extraction valve. The movement of the extraction piston upwards then releases a larger cross-section, ideally a cross-section, which is even larger than the diameter of the pilot bore. In such a case as well, the closing is supported ideally since gas can flow into the pressure sleeve through the larger diameter faster as this gas can be discharged through the pilot bore. When the magnetic force is switched off, the extraction valve can be closed quite quickly and reliably by the movement of the extraction piston.

The needle can then be designed advantageously in such a way that it is prestressed against the extraction piston via a spring element and is limited through a stop on its way to the extraction piston. Such a layout enables a secure and reliable functionality at minimal manufacturing tolerances. The needle can be formed in particular with a conic termination in the direction of the extraction piston. It can plunge in a correspondingly metal counterpart of the restrictor. The needle can then be pressed against said surface in the lower, i.e. the closed position of the extraction piston, due to the force of the spring, so that a relative small flow cross-section remains free or no or almost no cross-section remains free when the elements are pressed against each other. The opening of the extraction piston is then supported ideally. If the extraction piston moves into its upper position, the needle is then, driven over a portion of the way before reaching the stop. There is thus the opportunity to release a comparatively larger cross-section, which can be traversed, between the needle and the restrictor, when the lift of the extraction piston is larger than the admissible maximal lift of the needle. This provides a cross-section which is larger than the cross-section of the pilot bore so that even the closing can be supported in an ideal manner.

In a further very favourable embodiment of this idea, it can also be provided that a sealing surface, in particular a metal sealing surface, is formed between the needle and the extraction piston, which surface then meshes sealingly when the extraction piston is in its position facing away from the inside of the pressure sleeve, i.e. in its closed position. Ideally, the sealing surface is here designed as a radial sealing surface since to do so a straightforward assembly with acceptable tolerances is possible.

In particular, in the case last mentioned, it can always be provided as a matter of principle that the tip of the needle does not extended conically pointed but tapers accordingly through two, in particular three mounted surfaces. To do so, a larger cross-section is released comparatively fast with a small lift and the needle is comparatively heavy-duty from a mechanical viewpoint, with respect to a conical and very sharp needle, which tapers over a comparatively long way.

In a further very favourable layout of the extraction valve according to the invention, it can now be provided moreover that a guide pin is arranged in the main body, a guide pin which co-operates with a guide bore in the extraction piston in such a way that the extraction piston cannot rotate around the longitudinal axis. This is particularly advantageous when using a needle, but can also be employed in a layout without needle. The anti-twist effect provided by the guide pin guarantees on the one hand that the needle is not damaged since it can target a point with great accuracy in the area into which it must penetrate. In case when no needle is desired, as well as in case when a needle is desired it is moreover guaranteed that the sealing surfaces between the compressed gas reservoir and the discharge opening, which are arranged in the main body on the one hand and in the extraction piston on the other, do not twist against each other during operation. The surfaces, which adjust to each other with time, between the gasket and the sealing surface always remain in the same position facing each another: The result is a significant improvement of the sealing of the extraction valve in the area of its gasket mainly utilised between the area of the compressed gas reservoir and the extraction opening.

The extraction valve can, as already mentioned, be employed in particular at high pressures, for instance for compressed natural gas, which is stored typically at rated pressures in the order of magnitude of 260 bar or with hydrogen, which is stored nowadays in particular at rated pressures of 700 bar. In particular for such high pressures, the extraction valve provides a very secure and reliable functionality in case of a very simple assembly. The preferred usage of the extraction valve according to the invention hence consists in the extraction of gas as a fuel for a vehicle flowing out of a compressed gas reservoir, in which the gas is stored at a rated pressure of more than 250 bar, in particular more than 650 bar. The vehicle can then be driven with the extracted gas for instance via an internal combustion engine. In particular for the storage of hydrogen, the usage of hydrogen in a fuel cell or a cell fuel system can be provided alternately to such a drive by burning the hydrogen a system through which electrical drive power is supplied for the vehicle.

Additional favourable and advantageous further embodiment of the extraction valve according to the invention can be seen in the exemplary embodiments, which are described in more detail below with reference to the figures.

Wherein.

Figure 1:
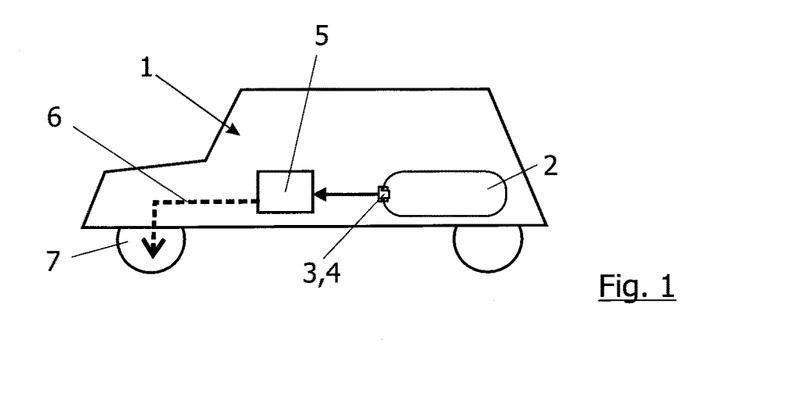
FIG. 1 shows a vehicle indicated by way of principle.

The illustration of FIG. 1 shows an implicitly indicated vehicle 1. A compressed gas reservoir 2 is represented in the vehicle 1, a reservoir which can be part of a storage system for instance for compressed natural gas or hydrogen. The compressed gas reservoir or, if several are present, each of the compressed gas reservoirs, exhibits a specified valve 3, typically a so-called On-Tank-Valve (OTV). An extraction valve 4 is part of said valve 3 for the gas stored under high pressure in the compressed gas reservoir 2. This item cannot be seen clearly in the representation of FIG. 1, but will not be examined in detail at a later stage. The extracted gas reaches an energy converter 5 which can be designed by way of example as an internal combustion engine or as a fuel cell. The converter utilises the energy stored in the gas to produce for instance mechanical energy by combustion in an engine with reciprocating pistons or for example to generate electric energy in a fuel cell out of the gas and oxygen from the surrounding air. Said energy flow towards one of the wheels 7 is represented purely by way of instance, via an arrow designated in dotted lines with number 6. Lastly, the gas stored in the compressed gas reservoir 2 enables to provide driving energy for the vehicle 1.

Figure 2:
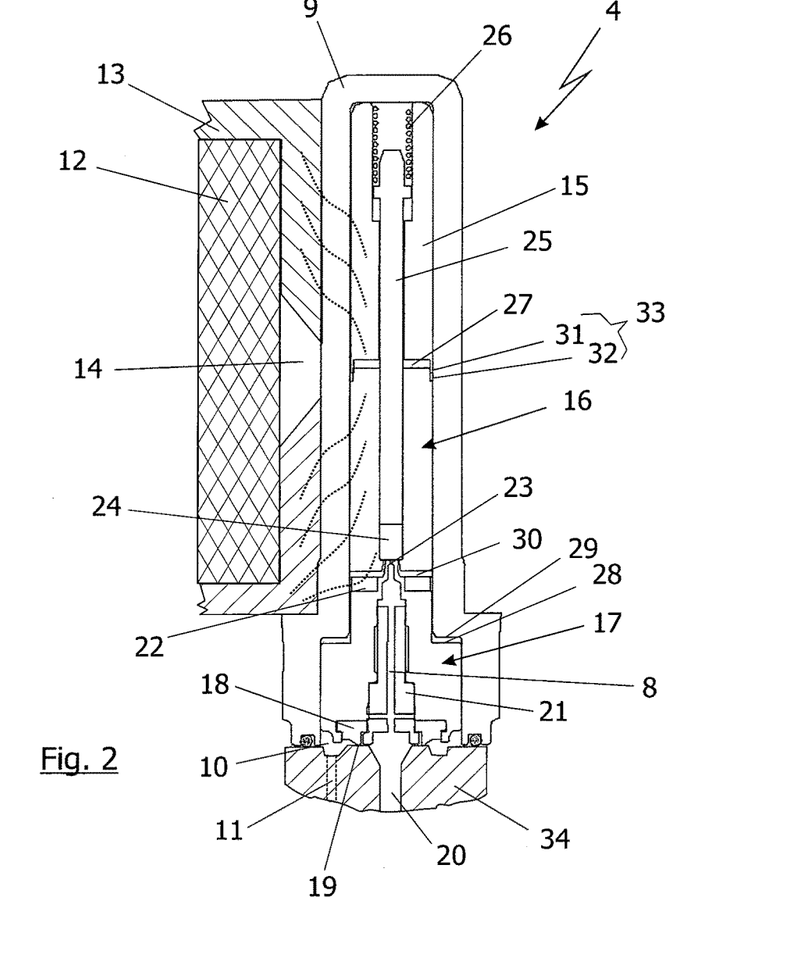
FIG. 2 shows a principle sectional view through a layout of an extraction valve.

The extraction valve 4 itself, which can be arranged in the valve 3 for instance analogically to the state of the art mentioned initially is illustrated in the representation of FIG. 2 in a first possible form of embodiment in a schematic sectional view. The extraction valve 4 includes to do so a pressure sleeve 9, which can be manufactured out of a non-magnetisable material, by way of example 1.4435 or SUSF316L. The so-called pressure sleeve is closed hermetically at one of its ends and is connected at its other and, sealed off via a gasket in the exemplary embodiment represented here, with a ring-shaped chamber 10, a chamber which is linked to the inside of the compressed gas reservoir 2 via a pipe 11 represented in dotted lines. The pressure in the whole pressure sleeve 9, at least after a certain period of time, will have propagated via splits between the inside wall of the pressure sleeve 9 and the components mounted therein. The pressure sleeve 9 is now surrounded by a coil 12 mounted on one side of the pressure sleeve 9. The coil 12 includes moreover a magnetisable coil yoke 13, which contains in a medium area an interruption 14 with respect to the axial length of the pressure sleeve 9. The coil 12 and the coil yoke 13 with the interruption 14 are consequently designed preferably as rotation-symmetrical or mirror-symmetrical and arranged around the pressure sleeve 9 designed as rotation-symmetrical.

The pressure sleeve 9 includes first of all a core 15, in the representation of FIG. 2 from top to bottom, i.e. from the hermetically closed side of the pressure sleeve 9 to the open side of the pressure sleeve 9, which consists of magnetisable material, for instance 1.4016IM. An anchor 16, which can be made of the same material, is connected to said core 15, which is pressed-in into the pressure sleeve 9. An extraction piston 17 which is composed of several parts in the exemplary embodiment illustrated here, is placed downstream of the anchor 16. It contains in the exemplary embodiment illustrated here a sealing device 18, which hermetically seals the ring-shaped chamber 10 connected to the inside of the compressed gas reservoir 2 against a central extraction opening 20, which is connected indirectly to the energy converting unit with a counter-element 19, in this case a flat surface on a main body 34. The extraction piston 17 includes moreover a screwed-in central element 21 as well as on its side facing the anchor 16 a ring 22, which is designed by way of example as a permanent magnet, in particular however of magnetisable material, for instance of the same material as the anchor 16 and the core 15. In this example, the rest of the extraction piston 17 with the exception of the gaskets 18, can be made way of example of a non-magnetisable material, for instance the material of the pressure sleeve 9. The area of the extraction piston 17 facing the hermetically sealed end of the pressure sleeve 9 includes moreover a pilot bore 23 which is typically designed as a bore with a very small diameter, for instance a diameter of a few 10 to a few 100 μm. Said bore is connected with a discharge opening 8 in the central element 21. Said pilot bore 23 is hermetically sealed via a sealing element 24 when the extraction valve 4 is sealed as represented in FIG. 2. The sealing element 24 which is supported by a rod 25, which penetrates through the anchor 16 and the core 15, on a spring element 26 at the hermetically sealed end of the pressure sleeve 9.

The illustration of FIG. 2 shows the extraction valve 4 sealed hermetically in which the extraction piston 17 is positioned in such a way that it seals off accordingly the ring-shaped chamber 10 with respect to the extraction opening 20. If the coil 11 is now energised, a magnetic flow is generated in the coil yoke 13 in particular. The magnetic field lines cannot form however a closed magnetic circuit due to the interruption 14 in the coil yoke 13. They will consequently migrate through the non-magnetisable material of the pressure sleeve 9 into the material of the core 15. This is represented by certain dotted lines by way of example. They endeavour to overcome an air gap 27 between the core 15 and the anchor 16 to return to the coil yoke via the anchor 16. Since the air gap 27 is smaller than the interruption 14, the path of the magnetic field lines indicated, is preferred. Advantageously, the air gap 27 is closed to guarantee a maximal magnetic flow. The magnetic forces consequently move the anchor 16 over the sealing element 24 and the rod 25 in a supported manner against the force of the spring element 26 in the direction of the core 15, which enables to close the air gap 27. The air gap 27, which includes a split width typically smaller than 0.7 mm when said gap is open, is closed to zero so that the anchor 16 lies immediately on the core 15. This promotes the preferred maximum possible magnetic flow.

The layout with the sealing element 24 co-operating with the anchor 16 sees to it that on the one hand the force of the spring element 26 must be overcome when moving the anchor. On the other hand, the pilot bore 23 opens when the anchor 16 moves, since the sealing element 24 rises from the same. As already mentioned, the same pressure as in the compressed gas reservoir reigns in the inside of the pressure sleeve 9 typically, i.e. for instance when storing hydrogen approx. 700 bar rated pressure. As there is no pressure or a much smaller pressure in the extraction opening 20 which leads to the energy converter 5, the gas situated in the pressure sleeve 9 is discharged via a central discharge opening in the anchor 16 and the extraction opening 20 corresponding to said discharge opening, once the pilot bore 23 has opened. The pressure in the area of the annular chamber 10 can be identical or also much higher than in the area of the pressure sleeve 9 above the extraction piston 17. In case of a differential pressure, the latter can promote the upward shift of the extraction piston 17 out of the position illustrated in FIG. 2, in addition to the magnetic force. With identical pressures, i.e. a zero differential pressure, the extraction piston is opened or held open only by the magnetic force. Switching operations at maximal differential pressure are in particular prevented in particular so that the pressure is compensated solely by the actively switched pilot bore 23.

To achieve that still the extraction piston 17 remains in its open position securely and reliably, the ring 22 already mentioned made of magnetisable material is arranged on the side of the extraction piston 17 facing the anchor 16. Said layout enables that at least when the extraction piston 17 has moved in the direction of the hermetically sealed end of the pressure sleeve 9, until its shoulder 28 strikes against the counter-stop 29, that a portion of the magnetic field lines also pass through the ring 22 and so maintain securely the extraction piston 17 in the area of the anchor 16 as long as the coil 12 is excited. The layout of the extraction piston 17 and in particular the distance between the side of the ring 22 facing the anchor 16 and the shoulder 28 is to do so designed in such a way that an air gap 30 between the ring 22 and the anchor 16 does not close at zero, but that a minimal air gap always remains to release a defined cross-section between the extraction opening 20 and the annular chamber 10 over the stop of the shoulder 28 on the opposite stop 29.

The coil 12 is accordingly excited for actuating the valve, i.e. to open it. A slightly larger current is typically necessary until the anchor 16 breaks away. The current can be reduced subsequently so as to hold said anchor 16. The condition already described then adjusts itself. If the extraction valve 4 should be closed again, the coil 12 is switched off. The anchor 16 and the extraction piston 176 then come away from each other via its ring 22 made of magnetic material, whereas the pilot bore 23 is closed hermetically and accordingly via the sealing element 24 by the force of the spring element 26. To do so, the same pressure as in the area of the extraction opening 20 adjusts itself in the area of the pressure sleeve 9 so that the closed condition illustrated in FIG. 2 is adopted due to the force of the spring element 26.

The representation of FIG. 2 now shows in the edge region of the air gap 27 between the anchor 16 and the core, a residue 31 of the core 15 and a reclaimed material 32 of the anchor 16 corresponding with said residue 31. This is also designated as a whole as a cone and is indicated by the reference sign 33. Such a cone 33 enables to maximise the attraction force between anchor 16 and core 15 at a set distance.

As mentioned, it is necessary with said layout that the pressure propagates through the gap space always required due to the mobile extraction piston 17 between the extraction piston 17 and the pressure sleeve 9 accordingly in the pressure sleeve 9. It can co-operate with an operating mode difficult to grasp since the split masses, in particular with respect to the pilot bore 23, are not always as accurate as desired.

Figure 3:
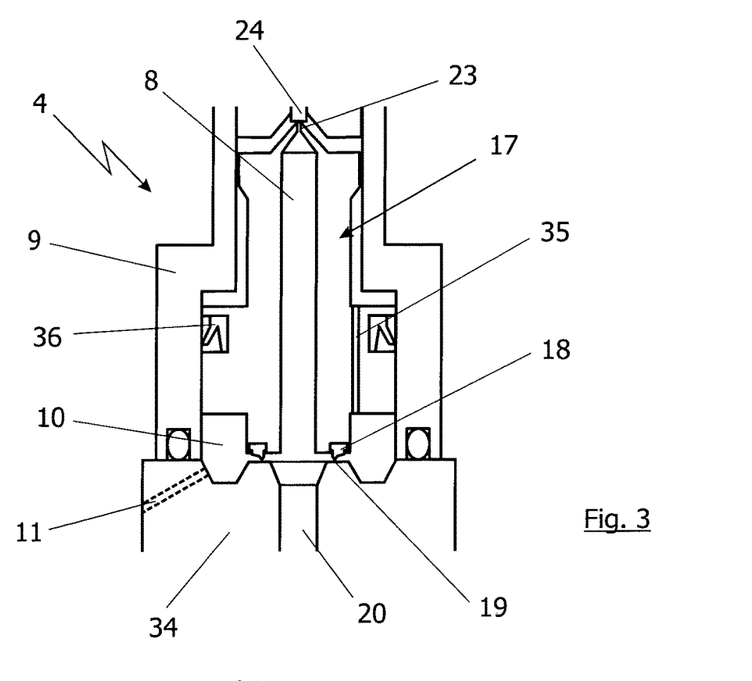
FIG. 3 is a sectional view showing the extraction piston analogically to the representation in FIG. 2 in a first possible form of embodiment according to the invention.

It is now provided in the further embodiment represented schematically in the FIG. 3 and following in sectional views, to remedy the situation in such a way that the extraction piston 17, as indicated for instance in the representation of FIG. 3, includes a bypass bore 35 between the annular chamber 10 and the opposite side of the extraction piston 17. A gasket 36 is provided simultaneously between the extraction piston 17 and the pressure sleeve 9 parallel to the bypass bore 35, a gasket which prevent the overflow of gas through the split between the pressure sleeve 9 and the extraction piston 17. The bypass bore 35 achieves a targeted gas overflow from the annular chamber 10 into the inside of the pressure sleeve 9.

Figure 4:
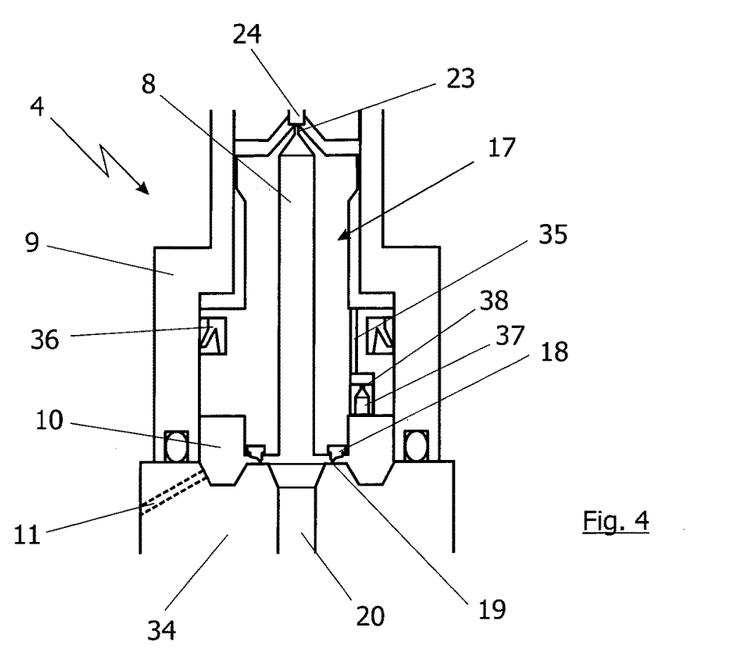
FIG. 4 is a sectional view showing the extraction piston analogically to the representation in FIG. 2 in a second possible form of embodiment according to the invention.

It is now preferable that the bypass bore 35 has a smaller diameter than the pilot bore 23 to support the opening of the extraction valve 4. Ideally, the layout is then realised in such a way that the pilot bore 23 has a diameter at least twice as large as the bypass bore 35. With the pilot bore of 150-250 µm, it would correspond to a bore diameter for the bypass bore 35 in the order of magnitude of 75-125 µm. This is quite difficult to realise over the whole length of the bypass bore 35 so that it can be provided according to an advantageous further development shown in FIG. 4, and that a throttle sleeve 37 is inserted into the bypass bore 35, which expands accordingly at its lower end in the represented exemplary embodiment. Said throttle sleeve 37 can be for instance screwed-in, glued-in or mounted otherwise. Ideally, said throttle sleeve is connected to the material of the extraction piston 17 and pressed into the bypass bore 35. A restrictor designated in the illustration with the reference sign 38 can be realised quite easily in the throttle sleeve 37 itself as a small bore. The diameter of said restrictor 38 can be produced independently of the extraction piston with great accuracy and be integrated into the extraction piston 17 by a pressed fit.

Figure 5:
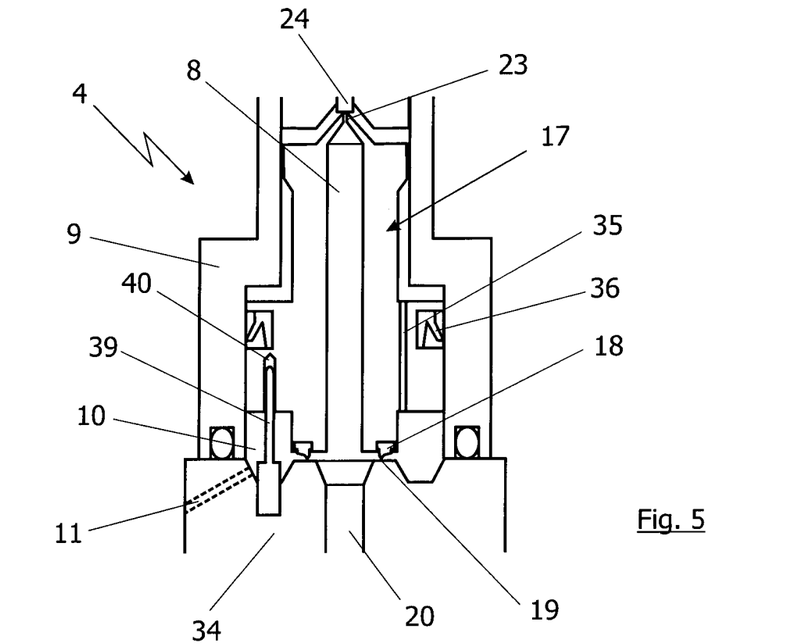
FIG. 5 is a sectional view showing the extraction piston analogically to the representation in FIG. 2 in a third possible form of embodiment according to the invention.

The representation of FIG. 5 shows an alternative embodiment analogically to the representation in FIG. 3. It goes without saying that it can be combined accordingly with the layout illustrated in FIG. 4. The layout in the representation of FIG. 5 shows to do so a guide pin 39, which is rigidly connected to the main body 34. It plunges in a guide bore 40 arranged in the extraction piston 17 in the lower, closed position of the extraction piston 17 illustrated here and guarantees a torsion-proof guided extraction piston 17. This is particularly advantageous in the area of the gaskets 18 and its contact surface 19 since both these elements adapt to each other with time so that possible inaccuracies and depressions of the surface appear with time in the gasket 18, and vice-versa. If said position of the parts with respect to each other is not modified any longer, the hermetic seal is improved.

Figure 6:
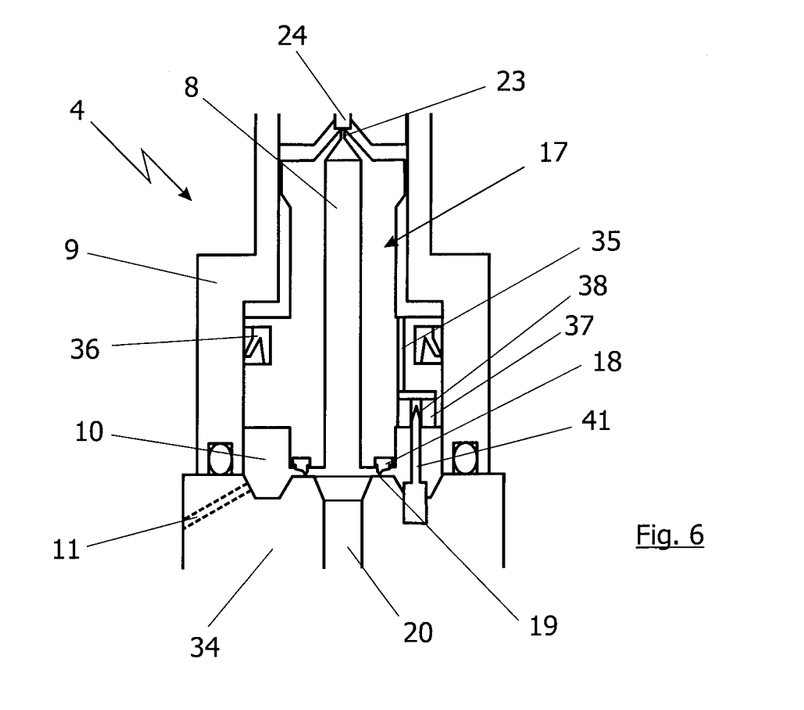
FIG. 6 is a sectional view showing the extraction piston analogically to the representation in FIG. 2 in a fourth possible form of embodiment according to the invention in a first position of the extraction piston.

As already mentioned it appears that the diameter of the bypass bore 35 or of a restrictor 38 is ideally smaller or much smaller than the opening diameter of the pilot bore 23 for optimal opening of the extraction valve 4. The result is that in the gas situated inside of the pressure sleeve 9 is discharged through the pilot bore through the discharge opening 8 in the extraction piston 17 and arrives at the area of an internal combustion engine or of a fuel cell through the central extraction opening 20 for instance. If quick discharge at minimal counter-pressure in the extraction opening 20 is possible, then gas flows through the bypass bore 35 or its restrictor 38, if present, slowly out of the annular chamber 10, so that the extraction piston 17 is moved upwards through the pressure in the annular chamber 10 and is then held magnetically. In the opposite case, it would now be desirable that a diameter is larger in the area of the bypass bore 35 than in the area of the pilot bore 23, since an exchange in the other direction, i.e. a faster inflow of gas into the inside of the pressure sleeve 9, as said gas is discharged through the pilot bore 23, can only be achieved under those conditions. This would promote the quick and reliable closing of the extraction piston 17 when the electromagnetic field is switched off. To obtain now said configuration, it can be provided, as can be seen in the representation of FIG. 6, according to an advantageous further embodiment of the idea of the invention, that a needle 41 is arranged in the main body 34, a needle which co-operates accordingly with the throttle sleeve 37 or a restrictor 38 of the bypass bore 35. The throttle sleeve 37 constitutes again a favourable variation of the layout, as a matter of principle, the layout could also be realized without the throttle sleeve 37.

The needle 41 is connected rigidly with the main body 34. A cylindrical section part of the needle 41, at least partially in the inside of the sleeve 37, occupies the lower position of the extraction piston 17 represented in FIG. 6, also when the extraction valve 4 is closed. This guarantees that only a minimal traversable cross-section is released, which corresponds to a few μm in the bypass bore 35 with a very strong restrictor 38, by way of example with a choking. According to the manufacturing accuracy, a metal seal can be achieved between the cylindrical portion of the needle 41 and the corresponding portion of the restrictor 38 in the throttle sleeve 37. The needle 41 extends pointedly in the front area, which can happen by way of example due to three surfaces mounted therein, in case of heavy-duty layout. If the extraction piston 17 now moves into its upper open position, which can be seen in the representation of FIG. 7, the needle 41 connected rigidly to the main body 34 and the throttle sleeve 37 raise so far away from each other that a comparatively larger traversable cross-section is released. Said relative large traversable cross-section is thus ideally larger than the diameter of the pilot bore 23, it may be for example in an order of magnitude of approx. 300-500 μm. The result is that an open extraction valve 4 creates a situation which causes a very fast closing of the extraction valve 4 when the coil 12 has been de-energised inasmuch as gas can flow through the bypass bore 35 faster into the inside of the pressure sleeve 9 than it is discharged through the pilot bore 23. The result is the build-up of an additional compression force which moves the extraction piston 17 downwards in a supported manner and achieves the desirable sealing effect in the area of the gaskets 18 and their counter-surfaces 19.

Figure 8:
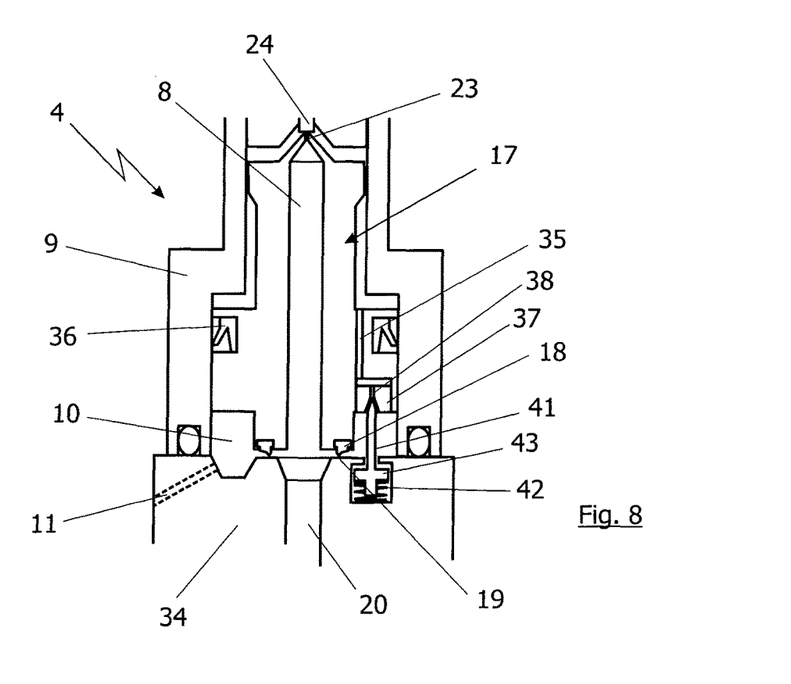
FIG. 8 is a sectional view showing the extraction piston analogically to the representation in FIG. 2 in a fifth possible form of embodiment according to the invention.

An alternative embodiment of the needle 41 can be seen in the representation of FIG. 8. The needle 41 extends conically in its upper area and co-operates in the exemplary embodiment represented here with a conically designed restrictor 38 in the throttle sleeve 37. The needle 41 itself is mounted in the main body 34 in such a way that it is prestressed by a spring element 42 in the direction of the extraction piston 17.

Simultaneously, the material of the main body 34 and an enlargement 43 on the needle 41 produce a stop so that the path of the needle 41 is limited accordingly in the direction of the extraction piston 17, i.e. upwards in the representation of FIG. 8. In the practical case represented here with the extraction piston 17 in its closed position, the spring 42 is slightly compressed so that a secure and reliable positioning of the needle 41 is achieved in the area of the restrictor 38. Ideally, the surfaces are adapted to each other, at least after a certain period of operating time, in such a way that even a reliable metal sealing effect is achieved. The traversable cross-section in such situation then ranges between zero and a few μm and is thus much smaller than the traversable cross-section of the pilot bore 23. The use of the spring 42 and of the conical needle 41 on the one hand and of the throttle sleeve 37 on the other hand enables to achieve a secure and reliable sealing effect with comparatively small requirements in terms of manufacturing tolerances in such a situation.

Figure 7:
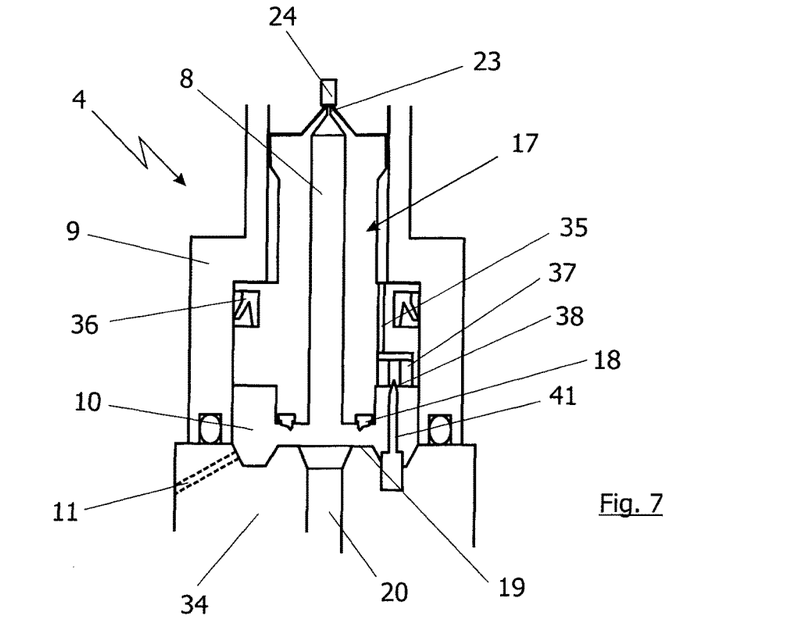
FIG. 7 shows a representation analogical to FIG. 6 in a second position of the extraction piston.

If the extraction piston 17 now moves back upwards into its open position, then the needle 41 is lifted from its opposite surface in the throttle sleeve 37 since the path of the needle 41 is limited by the stop formed by the enlargement 43 and the material of the main body 34 and said path is smaller than the possible stroke of the extraction piston 17. It is therefore possible that a split appears between the needle 41 and its opposite surface in the throttle sleeve 37, which releases a larger traversable cross-section than in the other position of the extraction piston 17, ideally a cross-section which is larger than the traversable cross-section of the pilot bore 23. The layout is comparable to the layout described in the FIGS. 6 and 7, is somehow more rentable in terms of manufacture by using the resilient means 42, since smaller manufacturing tolerances must be adhered to.

We refer to the earlier application DE 10 2013 014 141 as regards additional possible embodiments of the extraction valve 4, in particular of the anchor 10, of the core 15 as well as of the bar and the springs co-operating therewith. The executions mentioned there can be combined at will with the bypass bore 35 in the executions described here.

The invention claimed is:

1. An extraction valve for highly pressurized gas flowing from a compressed gas reservoir, the extraction valve comprising:
    a pressure sleeve hermetically sealed on one side;
    a mobile extraction piston, which by moving releases or seals an extraction cross-section, and which on an open side of the pressure sleeve protrudes at least partially into the same;
    an electromagnetic coil, which surrounds the pressure sleeve at least partially;
    an anchor made of magnetisable material which is mobile in the pressure sleeve;
    a pilot bore in the mobile extraction piston, which connects an inside of the pressure sleeve to a discharge opening for an extracted gas;
    a sealing element, which is pressed against the pilot bore by a spring element in a seal-forming manner;
    an operative connection between the sealing element and the anchor, so that the sealing element releases the pilot bore in case of movement of the anchor;
    the mobile extraction piston is made on its side facing the anchor at least partially of magnetisable or permanently magnetic material, wherein
    the mobile extraction piston is sealed off with respect to the pressure sleeve using a gasket; and
    a bypass bore is arranged in the mobile extraction piston, which bypass bore extends between a side facing a region connected to the compressed gas reservoir and a side of the mobile extraction piston facing to the inside of the pressure sleeve.

2. The extraction valve according to claim 1,
    wherein a main body rigidly connected to the pressure sleeve is arranged on a side of the mobile extraction piston facing away from the inside of the pressure sleeve.

3. The extraction valve according to claim 1,
    wherein a restrictor is provided in the bypass bore.

4. The extraction valve according to claim 3,
    wherein the restrictor has a smaller diameter than the pilot bore.

5. The extraction valve according to claim 3,
    wherein the restrictor is installed in a throttle sleeve integrated and press-fitted into the bypass bore.

6. The extraction valve according to claim 3,
    wherein a needle protruding in the direction of the mobile extraction piston is arranged in a main body, and the needle co-operates with the restrictor in such a way that a different diameter is released in a region of the restrictor according to a position of the mobile extraction piston.

7. The extraction valve according to claim 6,
wherein the needle co-operates with the restrictor in an end position of the mobile extraction piston facing away from the inside of the pressure sleeve in such a way that no flow cross-section is released or a flow section released in the end position of the mobile extraction piston is smaller than a flow section released in another end position of the mobile extraction piston.

8. The extraction valve according to claim 7,
wherein the needle co-operates with the restrictor in the end position of the mobile extraction piston facing away from the inside of the pressure sleeve in such a way that a flow section released in the end position of the mobile extraction piston is smaller than a flow section released in the another end position of the mobile extraction piston.

9. The extraction valve according to claim 8,
wherein the flow cross-section released in the end position of the mobile extraction piston is smaller than the pilot bore, and the flow cross-section released in the another end position of the mobile extraction piston is larger than the pilot bore.

10. The extraction valve according to claim 6,
wherein a sealing surface including a metal sealing surface is formed between the needle and the mobile extraction piston when the mobile extraction piston is in its end position facing away from the inside of the pressure sleeve.

11. The extraction valve according to claim 6,
wherein the tip of the needle tapers through at least two mounted surfaces.

12. The extraction valve according to claim 2,
wherein a guide pin is arranged in the main body, and the guide pin co-operates with a guide bore in the mobile extraction piston in such a way that the mobile extraction piston cannot rotate around its longitudinal axis.

13. The extraction valve according to claim 1, wherein the extraction valve is configured to extract gas as a fuel for a vehicle from a compressed gas reservoir, in which the gas is stored at a rated pressure of more than 250 bar.

* * * * *